United States Patent Office 2,891,984
Patented June 23, 1959

2,891,984

NEW DITHIOPHOSPHORIC ACID ESTERS AND THEIR USE FOR THE CONTROL OF MITES

Karl Gätzi and Paul Müller, Basel, Switzerland, assignors to J. R. Geigy A.-G., Basel, Switzerland No Drawing. Application May 13, 1955
Serial No. 508,297

Claims priority, application Switzerland June 10, 1954

6 Claims. (Cl. 260—461)

The present invention is concerned with new dithiophosphoric acid esters, with the production thereof and with their use in pest control, in particular for the control of mites.

Alkylmercaptoalkyl-, arylmercaptoalkyl- and aralkylmercaptoalkyl-O.O-dialkyl esters of monothiophosphoric acid have been described in the German patent specification No. 830,509. (β-Ethylmercapto-ethyl)-O.O-diethyl monothiophosphate which belongs to this group, has also become of practical importance as a systemic insecticide, but its toxicity is high for warm blooded animals. The aromatic analogues embraced by the above patent specification have neither been given further notice nor have they been used in practice.

The surprising observation has now been made that the S-arylmercaptomethyl-O.O-dialkyl esters of dithiophosphoric acid, which have not been known up to now, corresponding to the general formula:

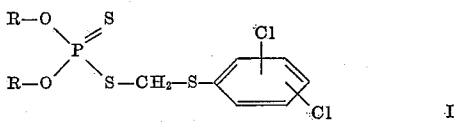

wherein R represents alkyl radicals with at most 3 carbon atoms, have an excellent acaricidal activity. At the same time, they have a relatively low toxicity for warm blooded animals so that they are excellently suitable for the control of mites, in particular in plant protection. Compared with the acaricidal activity, the insecticidal activity is relatively slight. However, the new dithiophosphoric acid esters according to the above definition can be used as additives to insecticides which have a long duration of action such as, for example, dicholorodiphenyl-trichlorethane, as their action also continues for a long time on plants and other substrata.

The new dithiophosphoric acid esters according to the above definition are produced in a simple manner by condensing a halogen methyl aryl sulphide of the general formula:

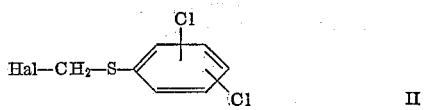

wherein Hal represents chlorine or bromine, with an alkali salt of an acid dithiophosphoric acid-O.O-dialkyl ester of the general formula:

wherein R has the meaning given above. It is advantageous to perform the reaction in an indifferent solvent such as water, alcohol, acetone or aliphatic or aromatic hydrocarbons at a normal or slightly raised temperature.

The halogen methyl aryl sulphides of the general Formula II are obtained by reacting an arylmercaptan of the general formula:

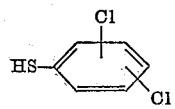

with formaldehyde in the presence of hydrogen halide, e.g. in a hydrochloric acid or hydrobromic acid aqueous solution.

The 2.4-dichloro-thiophenol and the 2.5-dichlorothiophenol can be used as arylmercaptans of the general Formula IV, all of which are known. They are produced by reduction of the corresponding sulphochlorides, for example by means of zinc and sulphuric acid. The 3.4-dichloro-thiophenol can be analogously produced. In particular, dithiophosphoric acid-O.O-dimethyl ester, -O-methyl-O-ethyl ester, -O.O-diethyl ester, -O.O-di-n-propyl ester, -O-methyl-O-isopropyl ester and -O.O-di-isopropyl ester can be used as acid dithiophosphoric acid dialkyl esters of the general Formula III. The following examples serve to illustrate the production of the new compounds. Parts are given as parts by weight and their relationship to parts by volume is as that of grams to cubic centimeters.

Example 1

Hydrogen chloride is introduced until saturation at 25–35° into a well stirred mixture of 17.9 parts of 3.4-dichloro-thiophenol, 100 parts by volume of 36% hydrochloric acid and 9 parts by volume of 37% aqueous formaldehyde solution. About 14 parts of hydrogen chloride are used. The reaction mixture is then diluted with ice water and ethered out, the ether extracts are washed with cold diluted caustic soda lye and water and evaporated. On distillation of the residue, 3.4-dichlorophenyl-chloromethyl sulphide passes over at 106–109° under 0.1 mm. pressure. The yield is 18.5 parts.

20.8 parts of the sodium salt of diethyl dithiophosphoric acid are dissolved in 200 parts by volume of acetone, the solution is filtered and the filtrate is boiled under reflux with 21 parts of 3.4-dichlorophenyl chloromethyl sulphide for 14 hours. The mixture is diluted with water, ethered out and the ether extracts are washed with diluted soda solution and water. The ether residue is dried until the weight is constant. 36 parts of dithiophosphoric acid-S-(3.4-dichloro-phenylmercapto-methyl)-O.O-diethyl ester are obtained as a colorless oil which distills without decomposition on molecular distillation at 150° at 0.001 mm. pressure.

The following aryl halogen methyl sulphides and the corresponding dithiophosphoric acid-S-(arylmercaptomethyl)-O.O-dialkyl esters for example are produced in an analogous manner:

(2.4-dichloro-phenyl)-chloromethyl sulphide, M.P. 61–62°, dithiophosphoric acid-S-(2.4-dichloro-phenylmercaptomethyl)-O.O-diethyl ester, B.P.$_{0.001}$ 130°, and dithiophosphoric acid-S-(2.4 - dichloro - phenylmercaptomethyl)-O.O-di-isopropyl-ester, B.P.$_{0.001}$ 150°;

(2.5-dichloro-phenyl)-chloromethyl sulphide, M.P. 34–35°, B.P.$_{13}$ 116–119°, dithiophosphoric acid-S-(2.5-dichloro - phenylmercaptomethyl) - O.O. - diethyl ester, B.P.$_{0.001}$ 120°.

The boiling points given for the dithiophosphoric acid esters all refer to the bath temperature on molecular distillation.

The new compounds can be used as such for the control of pests, in particular of mites which are injurious to plants. However, generally it is more advantageous to adapt them more closely to the intended use by combining them with the usual pulverulent, semi-solid (ointments), liquid or gaseous carriers. Both solutions and also emulsions and suspensions are suitable as combinations with liquid carriers; aerosols are meant by combinations with gaseous carriers. These latter are obtained by mixing the active ingredient, if necessary with the aid of an auxiliary solvent, with a propellant which is gaseous at normal pressure and temperature such as difluorodichloromethane or methyl chloride.

The active component itself can consist of one or more compounds of the defined formula. Also it can be used combined with other acaricidal, insecticidal, ovicidal, fungicidal or bactericidal substances. Examples of such are: α.α-bis-(chlorophenyl)-β.β.β-trichlorethane or -β.β-dichlorethane, 1.2.4.5.6.7.8.8-octachloro-3a.4.7.7a-tetrahydro-4.7-endomethylene indane, diethyl-p-nitrophenyl thiophosphate, diethyl-[2-isopropyl-4-methyl-pyrimidyl-(6)]-thiophosphate, 5.5-dimethyl-dihydroresorcinol-dimethyl carbamate, dinitrocresol, nitrated naphthylamines, mercury compounds or inorganic substances such as copper compounds, sublimate, sulphur, etc. Combined preparations having a great range of action are obtained in this way.

In the further examples below, the various forms of the agents for the control of mites and their use are described.

Example 2

1–5 parts of dithiophosphoric acid-S-(3.4-dichlorophenyl-mercaptomethyl)-O.O-diethyl ester, are rubbed and ground with 99–95 parts of talc, until the active substance is equally distributed over the carrier. The dusting agent so obtained has a good action against the imagines and larvae of red spiders, e.g. *Paratetranychus pilosus*, *Tetranychus urticae*, etc., it can however, also be used for the control of ticks. If a mixture of talcum, kaolin and ground limestone is used as carried, products with a similar action are obtained.

Example 3

10–25 parts of dithiophosphoric acid-S-(2.5-dichlorophenyl-mercaptomethyl)-O.O-diethyl ester are dissolved in a ratio of 1:2 in 85–65 parts of a mixture of diacetone alcohol and xylene and the solution is mixed with 5–10 parts of an emulsifying agent. An example of an emulsifier is a high molecular ethylene oxide condensation product. This mixture is emulsifiable in water and, used in a concentration of 0.1–1%, has a good action against the imagines and larvae of the red spider. If the solvent is replaced by 10–30 parts of mineral oil, then agents with an increased acaricidal and ovicidal action are obtained.

Example 4

0.1 part of dithiophosphoric acid-S-(2.4-dichlorophenylmercaptomethyl)-O.O-diethyl ester is dissolved in 5–10 parts of xylene and 94.9–89.9 parts of petroleum (B.P. 180–220°). A spray with an acaricidal action is obtained.

Example 5

20–25 parts of dichlorodiphenyltrichlorethane and 4–6 parts of dithiophosphoric acid-S-(3.4-dichlorophenylmercaptomethyl)-O.O-diethyl ester are dissolved in a ratio of 1:2 in a mixture of diacetone alcohol and xylene and the solution is mixed with 5–10 parts of an emulsifying agent of the ethylene oxide condensation product type.

The solution obtained is emulsifiable and, used in a concentration of 0.3–0.5%, has a good action against red spiders and at the same time it has excellent insecticidal activity.

What we claim is:

1. A dithiophosphoric acid ester corresponding to the formula:

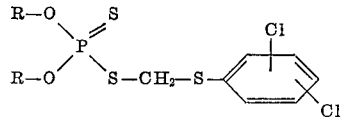

wherein R represents an alkyl group with at most 3 carbon atoms.

2. A dithiophosphoric acid ester corresponding to the formula given in claim 1, wherein R represents an ethyl radical.

3. A diothiophosphoric acid ester corresponding to the formula:

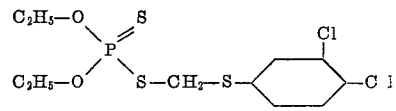

4. A dithiophosphoric acid ester corresponding to the formula:

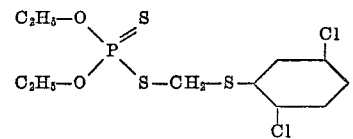

5. A composition for the control of mites comprising as active ingredient a compound corresponding to the formula:

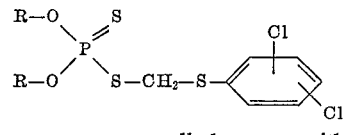

wherein R represents an alkyl group with at most 3 carbon atoms, and an inert carrier therefor.

6. A dithiophosphoric acid ester corresponding to the formula:

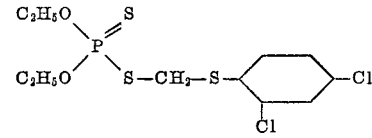

References Cited in the file of this patent

UNITED STATES PATENTS

| | | |
|---|---|---|
| 2,586,655 | Hook et al. | Feb. 19, 1952 |
| 2,793,224 | Fancher | May 21, 1957 |

FOREIGN PATENTS

| | | |
|---|---|---|
| 830,509 | Germany | July 8, 1949 |
| 850,677 | Germany | July 8, 1949 |

OTHER REFERENCES

Schwartz et al.: Surface Active Agents, 1949, pp. 495–497.